United States Patent
Roh et al.

(10) Patent No.: US 9,230,386 B2
(45) Date of Patent: Jan. 5, 2016

(54) PRODUCT PROVIDING APPARATUS, DISPLAY APPARATUS, AND METHOD FOR PROVIDING GUI USING THE SAME

(75) Inventors: Ui-chol Roh, Suwon-si (KR); Yun-suk Nam, Suwon-si (KR); Jae-ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 947 days.

(21) Appl. No.: 12/263,575

(22) Filed: Nov. 3, 2008

(65) Prior Publication Data

US 2009/0313125 A1    Dec. 17, 2009

(30) Foreign Application Priority Data

Jun. 16, 2008    (KR) .................. 10-2008-0056208

(51) Int. Cl.
  *G08C 19/16*    (2006.01)
  *G07F 9/02*    (2006.01)
  *G06Q 30/02*    (2012.01)

(52) U.S. Cl.
  CPC .............. *G07F 9/02* (2013.01); *G06Q 30/0224* (2013.01); *G06Q 30/0269* (2013.01)

(58) Field of Classification Search
  USPC ............ 340/10.1–10.6, 572.1–572.9; 705/43; 715/804, 863; 235/375–385
  See application file for complete search history.

(56) References Cited

U.S. PATENT DOCUMENTS

| | | | | |
|---|---|---|---|---|
| 4,972,068 A * | 11/1990 | Ohtani et al. | ................... | 235/375 |
| 5,482,139 A * | 1/1996 | Rivalto | ............................ | 186/36 |
| 5,568,604 A * | 10/1996 | Hansen | ........................ | 715/863 |
| 5,966,696 A * | 10/1999 | Giraud | ........................ | 705/14.41 |
| 6,118,888 A * | 9/2000 | Chino et al. | .................. | 382/118 |
| 6,507,279 B2 * | 1/2003 | Loof | ........................... | 340/572.1 |
| 6,535,132 B2 * | 3/2003 | Waters et al. | ............... | 340/573.1 |
| 6,809,762 B1 * | 10/2004 | Donnelly et al. | .......... | 348/231.7 |
| 7,024,180 B2 * | 4/2006 | Waters et al. | ............... | 455/414.1 |
| 7,272,456 B2 * | 9/2007 | Farchmin et al. | ............... | 700/66 |
| 7,546,551 B2 * | 6/2009 | Sakata et al. | .................. | 715/841 |
| 7,634,786 B2 | 12/2009 | Knee et al. | | |
| 7,644,039 B1 * | 1/2010 | Magee et al. | .................... | 705/43 |
| 7,665,040 B2 * | 2/2010 | Nakamura | .................... | 715/835 |
| 7,870,033 B2 * | 1/2011 | Swanson | ....................... | 705/26.1 |
| 8,004,704 B2 * | 8/2011 | Shimoichi | .................... | 358/1.15 |
| 8,200,552 B2 * | 6/2012 | Swanson | ....................... | 705/27.1 |
| 2002/0008626 A1 * | 1/2002 | Waters et al. | ............... | 340/573.1 |

(Continued)

FOREIGN PATENT DOCUMENTS

| | | | |
|---|---|---|---|
| CN | 1301458 A | 6/2001 | |
| CN | 1705962 A | 12/2005 | |

(Continued)

OTHER PUBLICATIONS

IBM Technical Disclosure Bulletin, vol. 38, No. 4, Apr. 1995, McLean, JA Pickover, CA Winarski, D, On-Line Vending Machine and Catalog Product Icons, pp. 1313-116.

(Continued)

*Primary Examiner* — Paul Obiniyi

(74) *Attorney, Agent, or Firm* — Sughrue Mion, PLLC

(57) ABSTRACT

A product providing apparatus and display apparatus, and a method for providing a GUI using the same are provided. The product providing apparatus includes a display unit, a collecting unit and a control unit which controls an image based on user characteristic information to be displayed.

37 Claims, 10 Drawing Sheets

(56) References Cited

U.S. PATENT DOCUMENTS

| | | | |
|---|---|---|---|
| 2002/0013144 A1* | 1/2002 | Waters et al. | 455/414 |
| 2002/0049725 A1* | 4/2002 | Nakade | 707/1 |
| 2002/0095676 A1 | 7/2002 | Knee et al. | |
| 2002/0184098 A1* | 12/2002 | Giraud et al. | 705/14 |
| 2002/0184111 A1* | 12/2002 | Swanson | 705/26 |
| 2003/0214532 A1* | 11/2003 | Nakamura | 345/764 |
| 2004/0075735 A1* | 4/2004 | Marmaropoulos | 348/51 |
| 2004/0100383 A1* | 5/2004 | Chen et al. | 340/572.1 |
| 2005/0080671 A1* | 4/2005 | Giraud et al. | 705/14 |
| 2005/0155056 A1 | 7/2005 | Knee et al. | |
| 2005/0283804 A1* | 12/2005 | Sakata et al. | 725/52 |
| 2005/0289478 A1* | 12/2005 | Landman et al. | 715/804 |
| 2006/0028400 A1* | 2/2006 | Lapstun et al. | 345/8 |
| 2006/0176508 A1* | 8/2006 | Sugahara | 358/1.15 |
| 2007/0008300 A1 | 1/2007 | Yang et al. | |
| 2007/0070397 A1* | 3/2007 | Shimoichi | 358/1.15 |
| 2007/0124694 A1 | 5/2007 | Van De Sluis et al. | |
| 2007/0277124 A1* | 11/2007 | Shin et al. | 715/863 |
| 2008/0036757 A1* | 2/2008 | Furukawa et al. | 345/418 |
| 2008/0189173 A1* | 8/2008 | Bakar et al. | 705/14 |
| 2008/0296365 A1* | 12/2008 | Schliebe | 235/379 |
| 2008/0306808 A1* | 12/2008 | Adjali et al. | 705/10 |
| 2010/0146543 A1 | 6/2010 | Knee et al. | |
| 2010/0257053 A1* | 10/2010 | Ferber et al. | 705/14.45 |
| 2011/0088060 A1 | 4/2011 | Knee et al. | |

FOREIGN PATENT DOCUMENTS

| | | | | |
|---|---|---|---|---|
| CN | 1797025 A | | 7/2006 | |
| CN | 101065766 A | | 10/2007 | |
| CN | 201044114 | | 4/2008 | |
| EP | 714043 A1 | * | 5/1996 | G02B 27/02 |
| EP | 0823696 A2 | | 2/1998 | |
| EP | 1071045 A1 | * | 1/2001 | G06T 15/20 |
| EP | 1 158 821 A1 | | 11/2001 | |
| EP | 1653414 A2 | * | 5/2006 | G07C 9/00 |
| JP | 07013536 A | * | 1/1995 | G06G 5/00 |
| JP | 07210137 A | * | 8/1995 | G09G 5/34 |
| JP | 07281294 A | * | 10/1995 | G03B 21/11 |
| JP | 08161596 A | * | 6/1996 | G07D 13/00 |
| JP | 09-282534 A | | 10/1997 | |
| JP | 2001-092574 A | | 4/2001 | |
| JP | 2001-117684 A | | 4/2001 | |
| JP | 2002-73321 A | | 3/2002 | |
| JP | 2006013938 A | * | 1/2006 | |
| JP | 2006209550 A | | 8/2006 | |
| JP | 3830716 B2 | * | 10/2006 | |
| JP | 2007-193292 A | | 8/2007 | |
| JP | 2008234331 A | | 10/2008 | |
| JP | 2008-268327 A | | 11/2008 | |
| KR | 1020010107261 A | | 12/2001 | |
| KR | 10-2006-0091310 A | | 8/2006 | |
| KR | 10-2007-0006477 A | | 1/2007 | |
| KR | 10-2007-0059107 A | | 6/2007 | |
| KR | 1020070064913 A | | 6/2007 | |
| WO | 03/027811 A2 | | 4/2003 | |
| WO | 2004/036503 A1 | | 4/2004 | |
| WO | 2006/029048 A2 | | 3/2006 | |
| WO | 2006029048 A2 | | 3/2006 | |
| WO | 2008/024861 A2 | | 2/2008 | |
| WO | 2008/024876 A2 | | 2/2008 | |
| WO | 2008/024878 A2 | | 2/2008 | |
| WO | 2009/016490 A2 | | 2/2009 | |
| WO | 2009/023782 A1 | | 2/2009 | |

OTHER PUBLICATIONS

International Search Report for PCT/KR2009/006055 issued Jun. 28, 2010 [PCT/ISA/210].

Written Opinion for PCT/KR2009/006055 issued Jun. 28, 2010 [PCT/ISA/237].

Communication dated May 3, 2012 issued by the State Intellectual Property Office of P.R. of China in counterpart Chinese Application No. 200810190716.7.

Communication, dated Mar. 5, 2013, issued by the Japanese Patent Office in counterpart Japanese Application No. 2011-553929.

Communication dated Dec. 12, 2012, issued by the State Intellectual Property Office of the People's Republic of China in counterpart Chinese Patent Application No. 200810190716.7.

Communication dated Dec. 3, 2013, issued by the Japanese Patent Office in counterpart application No. 2011-553929.

Communication dated Apr. 30, 2014 from the Korean Intellectual Property Office in a counterpart Korean application No. 10-2008-0056208.

Communication from the European Patent Office issued May 9, 2014 in a counterpart European Application No. 09850610.8.

Communication issued on Nov. 27, 2014 by the State Intellectual Property Office in related application No. 200810190716.7.

Communication issued on Mar. 10, 2015 by the Japanese Patent Office in related Application No. 2011553929.

\* cited by examiner

PRODUCT PROVIDING APPARATUS, DISPLAY APPARATUS, AND METHOD FOR PROVIDING GUI USING THE SAME

CROSS-REFERENCE TO RELATED APPLICATIONS

This application claims priority from Korean Patent Application No. 10-2008-0056208, filed on Jun. 16, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to providing a product providing apparatus and a display apparatus, and providing a graphical user interface (GUI) using the same, and more particularly, to providing a product providing apparatus and a display apparatus, and providing a GUI, in order to display screens according to information on users' personal characteristics.

2. Description of the Related Art

Consumers buy products using vending machines by inserting coins, paper money or credit cards. Such vending machines have become increasingly widespread because of the shortage of human resources and of changes in the consumption environment and consumption patterns. Additionally, vending machines occupy a small space and can be set up with little capital, so users can be provided with various products in diverse locations.

Users manually input commands to vending machines to select means of payment and the desired product, and vending machines then provide the users with the selected product up to the limit of the input money. Accordingly, vending machines provide products and menus in a standardized manner without any information regarding users.

However, a related art vending machine provides a product without tacking into consideration characteristics of a user who desires to buy the product, which may cause user inconvenience. For example, the fixed positioning of menu buttons may cause inconvenience to some users. Additionally, a user who prefers a certain food, may need to search for a menu item indicating the food from among a plurality of menu items displaying a plurality of products regardless of his or her taste, so it may be impossible for the user to select a menu item intuitively.

Therefore, there is a need for methods for users to buy products more conveniently and more intuitively, taking into consideration users' personal characteristics.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided a product providing apparatus having a user located within a predetermined distance of the product providing apparatus, the apparatus including a display unit which displays an image; a collecting unit which collects user characteristic information regarding the user located within the predetermined distance of the product providing apparatus; and a control unit which controls the image to be displayed based on the collected user characteristic information.

The image may include at least one of a menu screen showing products which the user is able to select, and an advertisement screen.

The collecting unit may include a touch screen to collect location information on a part of the touch screen touched by the user, wherein the user characteristic information includes the location information. The control unit may control the menu screen to be displayed based on the location information.

The image may be an advertisement screen to be displayed according to an age of the user, which may be estimated based on a height of the part of the touch screen touched by the user.

The collecting unit may include a position sensor to determine a body size of the user, wherein the user characteristic information includes the body size of the user. The control unit may control the image to be displayed based on the user characteristic information.

The user characteristic information may include the a height of the user, and the control unit may control the menu screen to be displayed based on the height of the user.

The user characteristic information may include a field of vision of the user, and the control unit may control the menu screen to be displayed within the field of vision of the user.

The image may be an advertisement screen to be displayed based on an age of the user, which may be estimated based on the user characteristic information.

The collecting unit may include a radio frequency identification (RFID) reader to read a radio frequency (RF) signal received from an RFID tag, wherein the RF signal includes the user characteristic information. The control unit may control the image corresponding to the read user characteristic information to be displayed.

The user characteristic information included in the RF signal includes at least one of information on a preference of the user, a gender of the user and an age of the user.

The collecting unit may include a plurality of input buttons, and the control unit may control the image to be displayed based on at least one input button selected by the user from among the plurality of input buttons.

The collecting unit may include a position sensor to detect horizontal movement of the user with respect to the product providing apparatus, and wherein the user characteristic information includes the horizontal movement of the user. The control unit may control an image corresponding to the horizontal movement of the user to be displayed.

The image may move left or right based on the horizontal movement of the user.

The menu screen may move left or right based on the horizontal movement of the user.

A form of the menu screen may change based on the horizontal movement of the user.

According to another aspect of the present invention, there is provided a method for providing a graphical user interface (GUI) including an image, the method comprising determining whether a user is within a predetermined distance; collecting user characteristic information regarding characteristics of the user, if it is determined that the user is within the predetermined distance; and generating the image based on the collected user characteristic information.

The image may include at least one of a menu screen showing products which the user is able to select, and an advertisement screen.

The collecting may include collecting location information on a part of a touch screen touched by the user, wherein the user characteristic information includes the location information.

The image may be an advertisement screen to be displayed based on an age of the user, which may be estimated based on a height of the part of the touch screen touched by the user.

The user characteristic information may include a body size of the user.

The user characteristic information may include a height of the user. The generating may include displaying the menu screen based on the height of the user.

The user characteristic information may include a field of vision of the user, and the generating may include displaying the menu screen within the field of vision of the user.

The image may be an advertisement screen to be displayed based on the user's age, which may be estimated based on the user characteristic information.

The collecting may include collecting the user characteristic information from an RF signal received from an RFID tag, wherein the user characteristic information is included in the RF signal.

The user characteristic information included in the RF signal may include at least one of information on a preference of a user, a gender of the user and an age of the user.

The collecting may include receiving a selection of at least one button selected from among a plurality of input buttons. The generating of the image may be performed based on the input button selected from among the plurality of input buttons.

The collecting may include detecting horizontal movement of the user, and the generating and displaying may include displaying an image corresponding to a horizontal movement of the user.

The image may move left or right based on the horizontal movement of the user.

The menu screen may move left or right based on the horizontal movement of the user.

The form of the menu screen may change based on the horizontal movement of the user.

According to another aspect of the present invention, there is provided a display apparatus comprising a display unit; a graphical user interface (GUI) generating unit which generates a GUI including an image; and a control unit which controls the GUI generating unit to generate the image based on user characteristic information and controls the display unit to display the image.

The user characteristic information may include at least one of information on a part of the display unit touched by a user, information on a height of the user, information on horizontal movement of the user, information on a button selected by the user, and information on the user contained in an RFID signal received from an RF tag of the user.

The image may correspond to at least one of information on the a preference of the user, a gender of the user and an age of the user which are obtained based on the user characteristic information.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
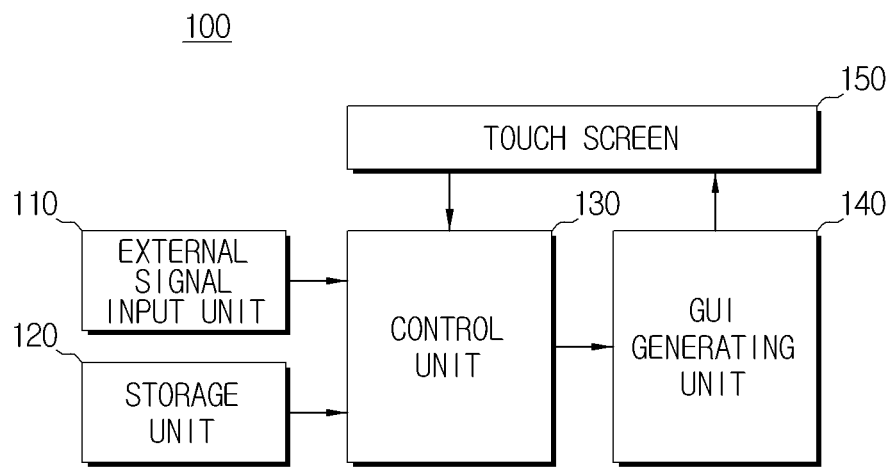
FIG. 1 is a block diagram of a vending machine according to a first exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of a vending machine 100 according to a first exemplary embodiment of the present invention. The vending machine 100 of FIG. 1 generates and displays a menu screen set according to users' personal characteristics, so that a user can select a desired product from the menu screen. Additionally, the vending machine 100 may generate and display an information providing screen or an advertisement screen according to the users' personal characteristics, in order to induce the user to buy products.

The vending machine 100 of FIG. 1 includes an external signal input unit 110, a storage unit 120, a control unit 130, a graphical user interface (GUI) generating unit 140 and a touch screen 150.

The external signal input unit 110 is communicably connected to external devices, and thus receives external input images stored in the connected external devices. For example, the external signal input unit 110 may be an interface to receive information matching the user characteristics, so the external signal input unit 110 may be connected to a server via the Internet and may receive information, such as news or weather reports. The external signal input unit 110 includes a terminal to be connected to the external devices.

The storage unit 120 stores programs required for the control unit 130 to control operations of the vending machine 100. Additionally, the storage unit 120 stores the menu screen set according to users' personal characteristics and the advertisement screen.

While the information providing screen is received by the external signal input unit 110 and the menu screen and advertisement screen are received by the storage unit 120 in the first exemplary embodiment of the present invention, there is no limitation thereto. Accordingly, the present invention is also applicable to a situation in which the menu screen is received by the external signal input unit 110.

The GUI generating unit 140 generates a GUI representing the menu screen, and displays the generated GUI on the touch screen 150. The operation by which the GUI generating unit 140 generates the GUI is controlled by the control unit 130.

The touch screen 150 displays an image to which the GUI output from the GUI generating unit 140 is added. The image may include a menu screen, advertisement screen and information providing screen.

The menu screen shows a plurality of GUIs indicating a plurality of products stored in a product storage unit (not shown) of the vending machine 100. For example, if beverages, such as cola drinks, citrus-flavored beverages or coffee are stored in the product storage unit (not shown), a menu screen comprising at least one of a GUI indicating cola drinks, a GUI indicating citrus-flavored beverages and a GUI indicating coffee may be displayed on the touch screen 150.

The advertisement screen may be used to advertise products stored in the product storage unit (not shown) of the vending machine 100 in order to induce users to buy the products, or may be used to advertise products other than the products stored in the product storage unit (not shown) or services in order to create advertising revenue.

The information providing screen functions to provide information, such as news or weather reports. A display of such an information providing screen may attract users' attention and may ultimately induce users to buy products.

The touch screen 150 functions to receive user operating commands input by a touch or dragging operation.

The control unit 130 controls the GUI generating unit 140 to generate and display a GUI in response to a user operating command input via the touch screen 150 or other manipulating means (not shown). Additionally, the control unit 130 collects user characteristic information input via the touch screen 150 and causes the touch screen 150 to display an image corresponding to the collected information.

Specifically, the control unit 130 collects location information regarding a part of the touch screen 150 touched by the user, and controls the GUI generating unit 140 and touch screen 150 so that a menu screen is generated based on the collected location information and the generated menu screen is displayed.

Hereinafter, a process of collecting location information on a touched part of the touch screen 150 and displaying a menu screen will be described in detail with reference to FIGS. 2 and 3.

Figure 2:
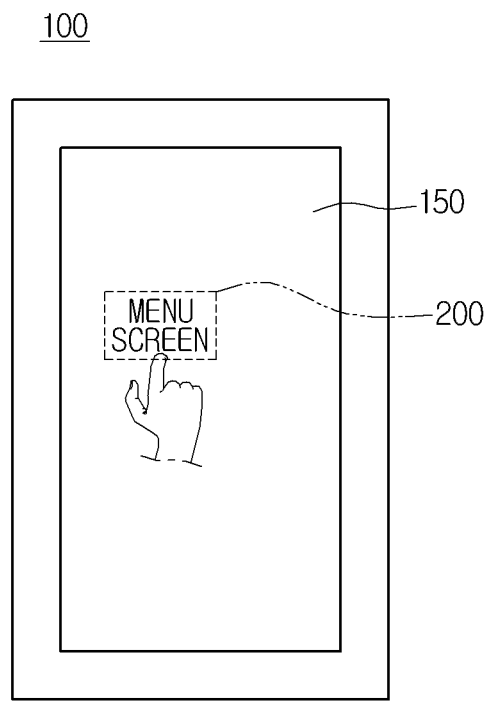
FIG. 2 illustrates a menu screen displayed on the vending machine according to the first exemplary embodiment of the present invention.
Figure 3:
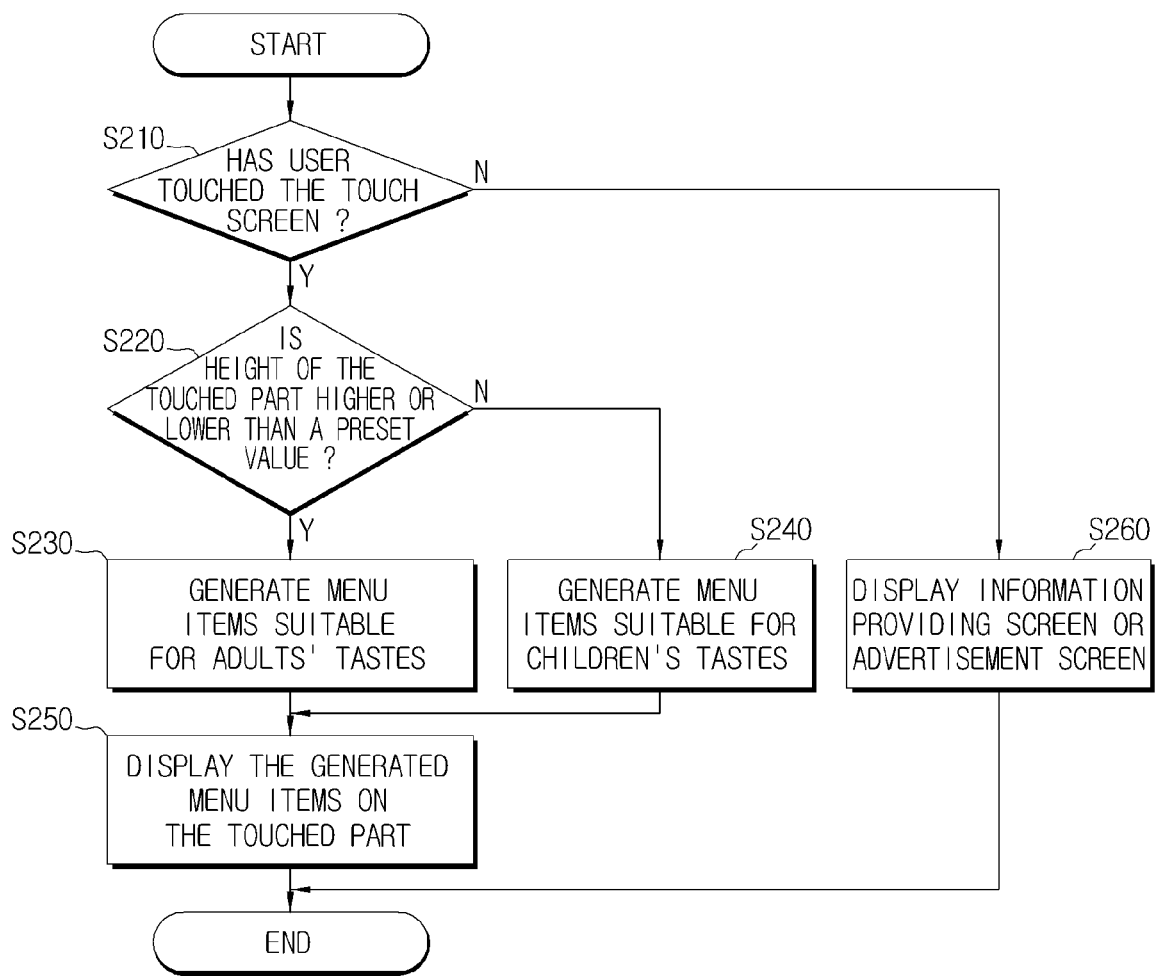
FIG. 3 is a flowchart illustrating a process of displaying the menu screen according to the first exemplary embodiment of the present invention.

FIG. 2 illustrates the vending machine 100 on which a menu screen 200 is displayed according to the first exemplary embodiment of the present invention, and FIG. 3 is a flowchart illustrating a process of displaying the menu screen 200 according to the first exemplary embodiment of the present invention.

In FIG. 2, the large-scale touch screen 150 is disposed on the front of the vending machine 100. The vending machine 100 collects location information regarding a part of the touch screen 150 touched by the user as user characteristic information. The control unit 130 causes the menu screen 200 to be displayed based on the collected location information.

The control unit 130 determines whether the user touches the touch screen 150 (S210). If it is determined that the user has not touched the touch screen 150 (S210-N), the control unit 130 causes the information providing screen or advertisement screen to be displayed on the touch screen 150 (S260).

If it is determined that the user has touched the touch screen 150 (S210-Y), the control unit 130 determines whether a height of the touched part is higher or lower than a preset value (S220).

If the user does not touch the touch screen 150, the vending machine 100 may determine that the user does not intend to buy any products, and may then display the information providing screen or advertisement screen to induce the user to buy products. Alternatively, if the user has touched the touch screen 150, the vending machine 100 may determine that the user desires to buy products, and may then display the menu screen 200 so that the user can buy a desired product via the menu screen 200.

If it is determined that the height is higher than the preset value (S220-Y), the control unit 130 controls the GUI generating unit 140 to generate menu items suitable for adults' tastes (S230).

Alternatively, if it is determined that the height is lower than the preset value (S220-N), the control unit 130 controls the GUI generating unit 140 to generate menu items suitable for children's tastes (S240).

For example, if the height is equal to or higher than 150 centimeters (cm), the control unit 130 controls the GUI generating unit 140 to generate menu items suitable for adults' tastes, such as coffee, green tea or cigarettes; and alternatively, if the height is equal to or lower than 150 cm, the control unit 130 controls the GUI generating unit 140 to generate menu items suitable for children's tastes, such as juice or cola drinks.

Accordingly, the control unit 130 estimates the user's age according to the height of the touched part, and then controls the GUI generating unit 140 to generate menu items suitable for the user's estimated age. Here, products such as coffee, green tea, cigarettes, juice or cola drinks, are previously stored in the product storage unit (not shown) of the vending machine 100.

Subsequently, the control unit 130 controls the touch screen 150 so that the menu screen 200 containing the generated menu items is displayed on the touched part of the touch screen 150 (S250).

Thus, the vending machine 100 estimates the user's age and constructs a menu according to whether the height of the touched part is higher or lower than the preset value, so it is possible for the user to buy desired products more easily and simply, and it is possible for a product provider to induce the user to buy products, thereby increasing sales.

Additionally, since the touched part of the touch screen 150 makes it easy for the user to perform input, the vending machine 100 can display the menu screen 200 on the touched part. Accordingly, the user can view the menu screen 200 more conveniently.

The menu screen 200 is displayed differently according to whether products suitable for adults' tastes or children's tastes are determined to be appropriate using a single reference such as the preset value in the exemplary embodiment of the present invention, but there is no limitation thereto. Accordingly, the present invention is also applicable to a situation in which the menu screen 200 is displayed using a plurality of references.

Additionally, while the information providing screen or advertisement screen is displayed when the user does not touch the touch screen 150, as described above, this is merely an example for convenience of description. Accordingly, it is possible to display one of the menu screen 200, information providing screen and advertisement screen according to a set mode, or to display other screens. For example, if the user touches the touch screen 150, the information providing screen or advertisement screen may be displayed in place of the menu screen 200, according to whether the height of the touched part of the touch screen 150 is higher or lower than the preset value. Additionally, if the user touches an upper part of the touch screen 150, news or advertisements suitable for adults' tastes may be displayed, and if the user touches a lower part of the touch screen 150, news or advertisements suitable for children's tastes may be displayed.

Figure 4:
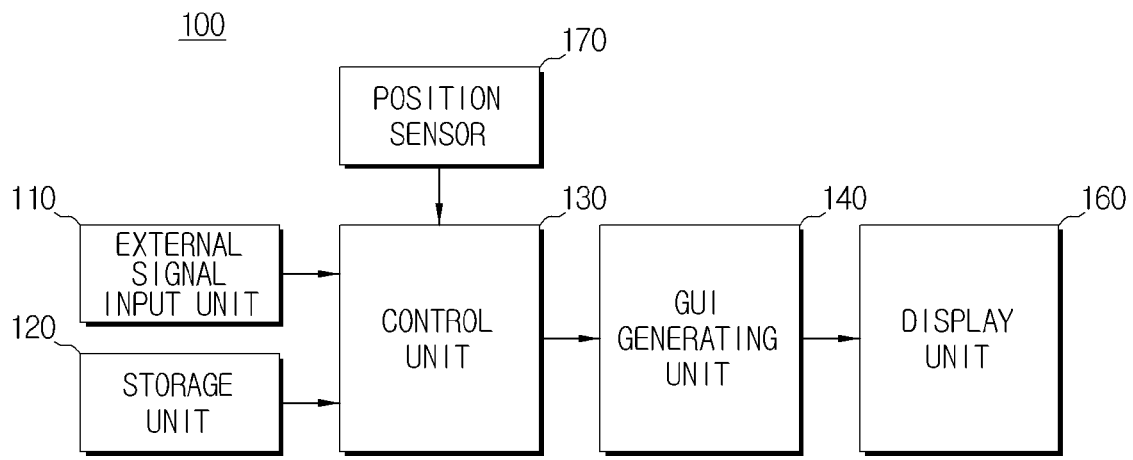
FIG. 4 is a block diagram of a vending machine according to a second exemplary embodiment of the present invention.

Hereinafter, a second exemplary embodiment of the present invention will be described in detail with reference to FIG. 4. FIG. 4 is a block diagram of a vending machine 100 according to the second exemplary embodiment of the present invention.

The vending machine 100 of FIG. 4 includes an external signal input unit 110, a storage unit 120, a control unit 130, a GUI generating unit 140, a display unit 160 and a position sensor 170. Here, the external signal input unit 110, storage unit 120, GUI generating unit 140 and display unit 160 shown in FIG. 4 are similar to or the same as the external signal input unit 110, storage unit 120, GUI generating unit 140 and touch screen 150 shown in FIG. 1, so no further description thereof is required. Only the position sensor 170 and control unit 130 shown in FIG. 4 are described below.

The position sensor 170 collects information on characteristics of a user located within a predetermined distance thereof For example, the position sensor 170 collects information on the height of the user located within the predetermined distance, and transfers the information on the user's height to the control unit 130.

The control unit 130 receives the information on the user's height collected by the position sensor 170 and causes an image corresponding to the received information to be displayed on the display unit 160.

Specifically, the control unit 130 collects the information on the height of a user located within a predetermined distance of the vending machine 100 using the position sensor 170, and controls the GUI generating unit 140 to generate a menu screen 200 based on the information on the user's height and to display the generated menu screen 200.

Hereinafter, a process of collecting information on the user's height and displaying the menu screen 200 will be described in detail with reference to FIGS. 5 and 6.

Figure 5:
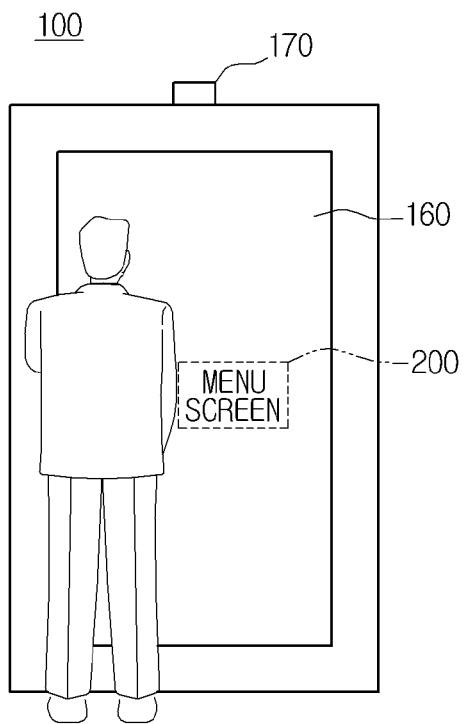
FIG. 5 illustrates a menu screen displayed on the vending machine according to the second exemplary embodiment of the present invention.
Figure 6:
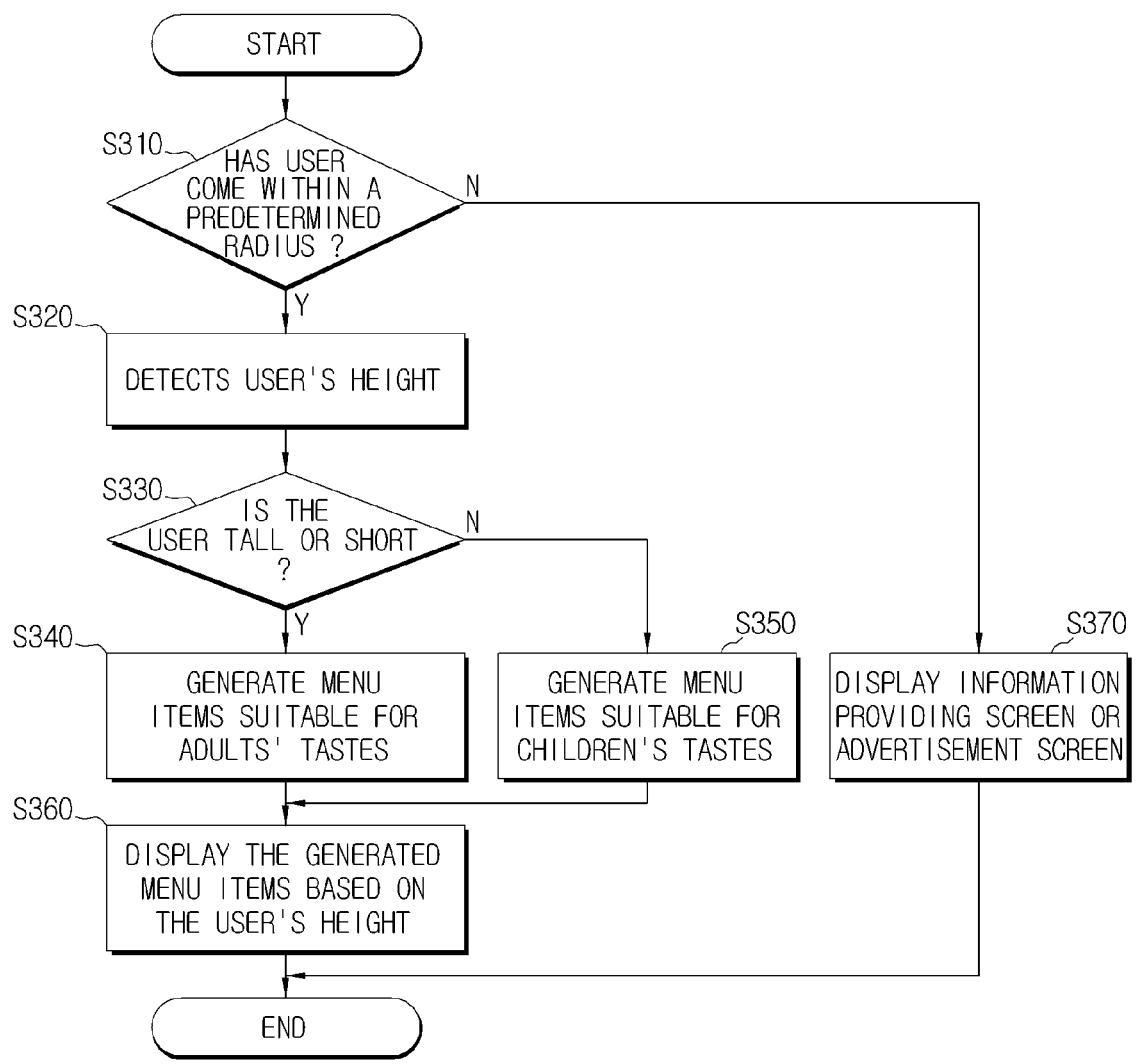
FIG. 6 is a flowchart illustrating a process of displaying the menu screen according to the second exemplary embodiment of the present invention.

FIG. 5 illustrates the vending machine 100 on which the menu screen 200 is displayed according to the second exemplary embodiment of the present invention, and FIG. 6 is a flowchart illustrating a process of displaying the menu screen 200 according to the second exemplary embodiment of the present invention.

In FIG. 5, the large-scale display unit 160 is disposed on the front of the vending machine 100, and the position sensor 170 is located on the top of the vending machine 100. The position sensor 170 determines the user's height as user characteristic information. The control unit 130 causes the menu screen 200 to be displayed based on the user's height.

While a single position sensor 170 is disposed on the top of the vending machine 100 in the second exemplary embodiment of the present invention, this is merely an example for convenience of description. Accordingly, the present invention is equally applicable to a situation in which a plurality of position sensors are disposed on areas other than the top of the vending machine 100.

The position sensor 170 determines whether the user comes within a predetermined radius of the vending machine 100 (S310). If it is determined that the user is not located within the predetermined radius (S310-N), the control unit 130 causes the information providing screen or advertisement screen to be displayed on the display unit 160 (S370).

If it is determined that the user is located within the predetermined radius (S310-Y), the position sensor 170 detects the user's height (S320).

If the user does not approach the vending machine 100, the vending machine 100 may determine that the user does not intend to buy products, and may then display the information providing screen or advertisement screen to induce the user to buy products. Alternatively, if the user has approached the vending machine 100, the vending machine 100 may determine that the user desires to buy products, and may then display the menu screen 200 so that the user can buy a desired product via the menu screen 200.

The position sensor 170 determines whether the user is tall or short (S330). If it is determined that the user is tall (S330-Y), the control unit 130 controls the GUI generating unit 140 to generate menu items suitable for adults' tastes (S340).

Alternatively, if it is determined that the user is short (S330-N), the control unit 130 controls the GUI generating unit 140 to generate menu items suitable for children's tastes (S350).

For example, if the user is greater than 150 cm, the control unit 130 may control the GUI generating unit 140 to generate menu items suitable for adults' tastes, such as coffee, green tea or cigarettes; and alternatively, if the user is less than 150 cm, the control unit 130 may control the GUI generating unit 140 to generate menu items suitable for children's tastes, such as juice or cola drinks. Accordingly, the control unit 130 estimates the user's age according to the user's height determined by the position sensor 170, and then controls the GUI generating unit 140 to generate menu items suitable for the user's estimated age.

Subsequently, the control unit 130 controls the menu screen 200 comprising the generated menu items to be displayed on a portion on the display unit 160 corresponding to the user's height (S360). Accordingly, it is possible for the user to select desired menu items from the menu screen 200 more conveniently.

Therefore, the vending machine 100 estimates the user's age and constructs a menu according to whether the user is tall or short, so it is possible for the user to buy desired products more easily and simply and it is also possible for a product provider to induce the user to buy products, thereby increasing sales.

Figure 7:
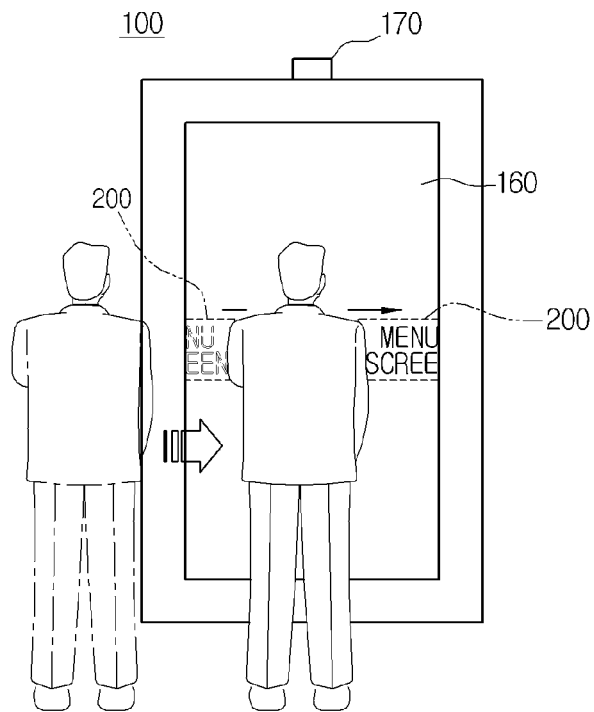
FIG. 7 illustrates a vending machine on which a menu screen is displayed according to the horizontal movement of the user.
Figure 8:
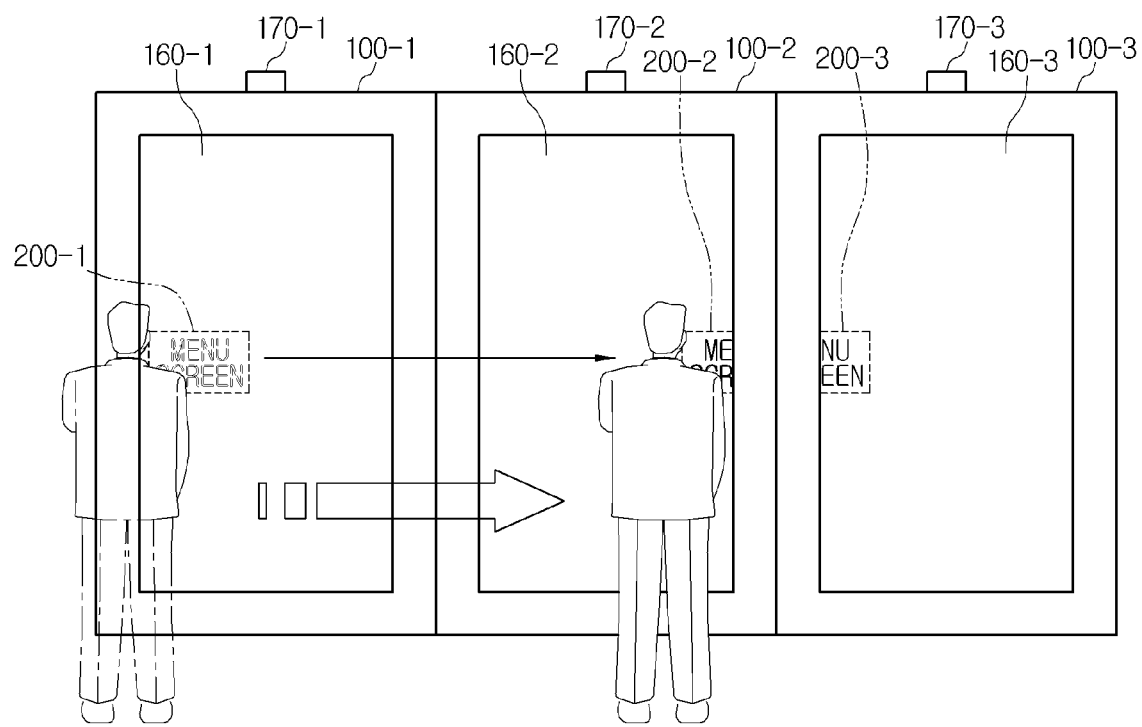
FIG. 8 illustrates a plurality of vending machines on which a menu screen is displayed according to the horizontal movement of the user.

Additionally, the position sensor 170 may collect information regarding horizontal movement of a user located within a predetermined distance of the vending machine 100. FIGS. 7 and 8 exemplarily illustrate a vending machine 100 which detects the horizontal movement of the user and displays the menu screen 200 according to the detected horizontal movement of the user.

In FIG. 7, the position sensor 170 detects the horizontal movement of the user within the predetermined distance of the vending machine 100.

After the position sensor 170 detects the horizontal movement of the user, and transfers information regarding the horizontal movement of the user to the control unit 130, the control unit 130 receives the information regarding the horizontal movement of the user from the position sensor 170, and causes the menu screen 200 to be displayed according to the received information.

For example, if it is determined that the user moves to the right, as shown in FIG. 7, the control unit 130 allows the menu screen 200 to move to the right on the display unit 160 so that the menu screen 200 is displayed according to the user's movement.

Additionally, the control unit 130 controls the form of the menu screen 200 to change according to the horizontal movement of the user. For example, if the user is located in front of the center of the vending machine 100, the menu screen 200 may also be displayed on the center of the vending machine 100. In this situation, as sufficient space exists on the right and left of the display unit 160, the control unit 130 may cause the menu screen 200 to be displayed horizontally. Accordingly, the user is able to select one or more menu items from the menu screen 200 on the same line.

Alternatively, if the user is located at the left of the vending machine 100, the menu screen 200 may also be displayed on the left of the vending machine 100. In this situation, there is not enough space to display the menu screen 200 on the left of the display unit 160, so the control unit 130 may cause the menu screen 200 to be displayed vertically, and the user is thus able to select one or more menu items from the menu screen 200 more conveniently. This is also applicable to a situation in which the user is located at the right of the vending machine 100. However, one of skill in the art would recognize that the menu screen 200 does not necessarily have to be displayed vertically, and may instead be displayed in other ways.

When first, second and third vending machines 100-1, 100-2 and 100-3 are connected to each other in series, as shown in FIG. 8, a menu screen 200-1 shown in FIG. 8 may be displayed according to the horizontal movement of the user, in the same manner as shown in FIG. 7.

In FIG. 8, the first, second and third vending machines 100-1, 100-2 and 100-3 have first, second and third position sensors 170-1, 170-2 and 170-3, respectively, which are able to detect the horizontal movement of the user.

If the first, second and third position sensors 170-1, 170-2 and 170-3 detect the horizontal movement of the user, the control unit 130 receives information regarding the horizontal movement of the user from each of the first, second and third position sensors 170-1, 170-2 and 170-3, and causes the menu screen 200-1 to be displayed on first, second and third display units 160-1, 160-2 and 160-3 according to the horizontal movement of the user.

For example, if the user moves from a location within a predetermined radius of the first position sensor 170-1 to a location within a predetermined radius of the second or third position sensors 170-2 and 170-3, the control unit 130 may control the menu screen 200-1 to move to the right on the first display unit 160-1 and then towards the second and third display units 160-2 and 160-3, so that the menu screen 200-1 may be displayed according to the movement of the user.

Additionally, if the user is located in front of the center between the second position sensor 170-2 and the third position sensor 170-3, the control unit 130 may control the GUI generating unit 140 to display one half 200-2 of the menu screen 200-1 on the second display unit 160-2 and to display the other half 200-3 on the third display unit 160-3.

Accordingly, when the plurality of vending machines are connected in series, the menu screen may move horizontally as the user moves to the right or left, so it is possible for the user to buy a desired product more conveniently and induce the user to buy products.

Figure 9:
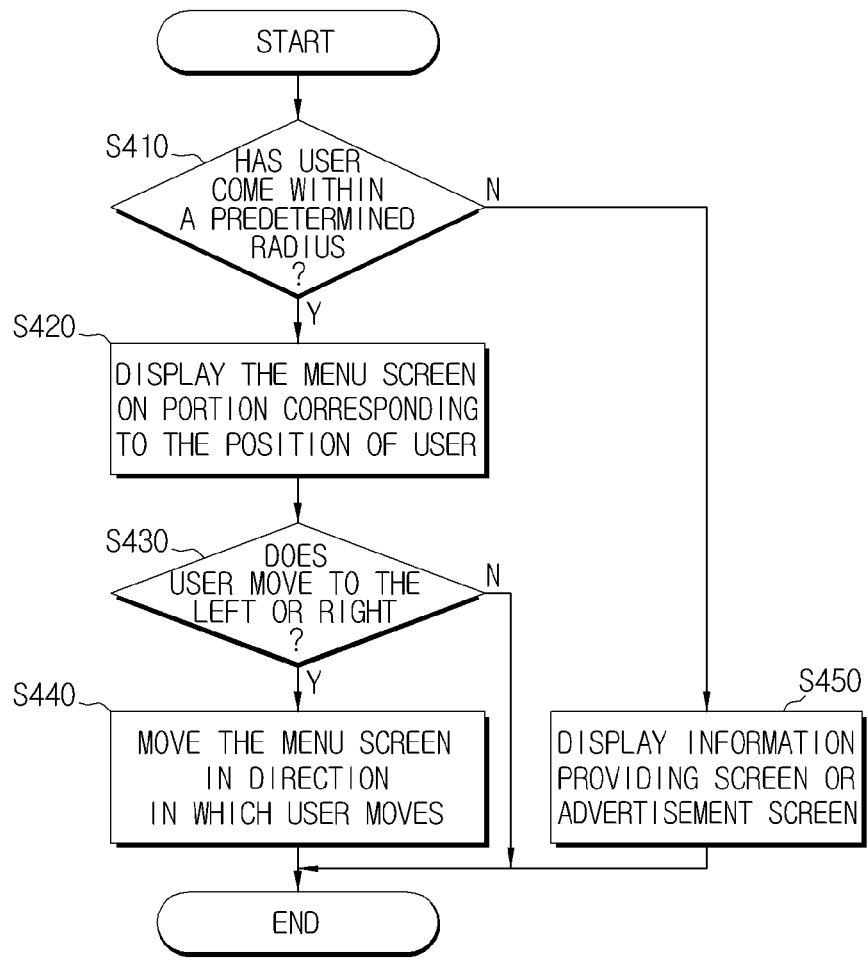
FIG. 9 is a flowchart illustrating a process of displaying a menu screen according to the horizontal movement of the user.

FIG. 9 is a flowchart illustrating a process of displaying the menu screen 200 according to the horizontal movement of the user.

The position sensor 170 determines whether the user comes within a predetermined radius of the vending machine 100 (S410). If it is determined that the user is not located within the predetermined radius (S410-N), the control unit 130 causes the information providing screen or advertisement screen to be displayed on the display unit 160 (S450).

If it is determined that the user is located within the predetermined radius (S410-Y), the control unit 130 causes the menu screen 200 to be displayed on a part of the display unit 160 corresponding to the position of the user (S420).

If the user does not approach the vending machine 100, the vending machine 100 may determine that the user does not intend to buy products, and may then display the information providing screen or advertisement screen to induce the user to buy products. Alternatively, if the user has approached the vending machine 100, the vending machine 100 may determine that the user desires to buy products, and may then display the menu screen 200 so that the user can buy a desired product via the menu screen 200.

If it is determined that the user moves to the left or right (S430-Y), the control unit 130 controls the menu screen 200 to move in a direction in which the user moves (S440).

Therefore, the vending machine 100 displays the menu screen 200 according to the horizontal movement of the user, so it is possible for the user to more easily and simply buy desired products, and for a product provider to induce the user to buy products, thereby increasing sales.

Figure 10:
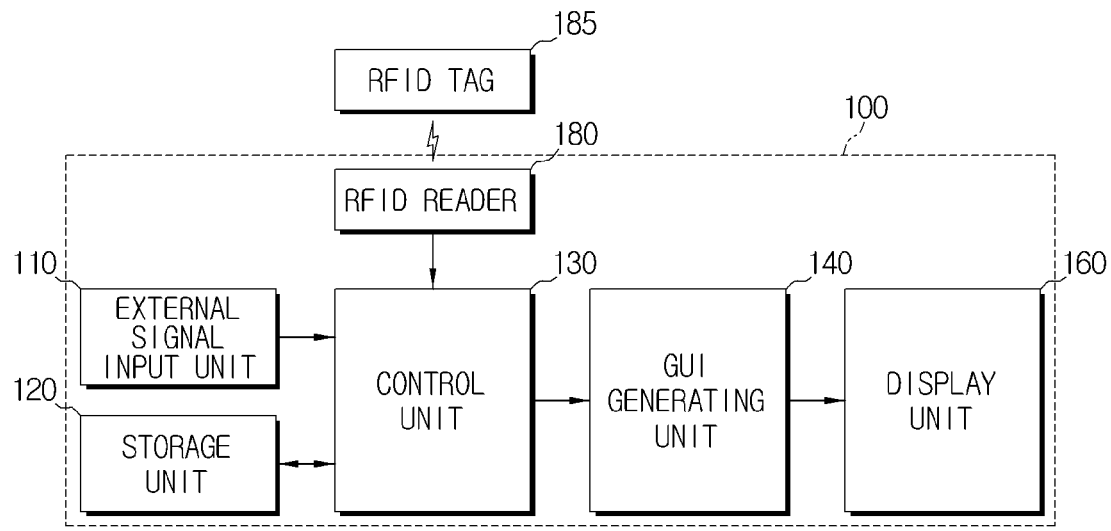
FIG. 10 is a block diagram of a vending machine according to a third exemplary embodiment of the present invention.

Hereinafter, a third exemplary embodiment of the present invention will be described in detail with reference to FIG. 10. FIG. 10 is a block diagram of a vending machine 100 according to the third exemplary embodiment of the present invention.

The vending machine 100 of FIG. 10 includes an external signal input unit 110, a storage unit 120, a control unit 130, a GUI generating unit 140, a display unit 160 and a radio frequency identification (RFID) reader 180. Here, the external signal input unit 10, storage unit 120, GUI generating unit 140 and display unit 160 shown in FIG. 10 are similar to or the same as the external signal input unit 110, storage unit 120, GUI generating unit 140 and touch screen 150 shown in FIG.

1, so no further description thereof is required. Only the RFID reader 180 and control unit 130 shown in FIG. 10 are described below.

The RFID reader 180 receives an RF signal from an RFID tag 185. In more detail, the RFID reader 180 reads information on a user located within a predetermined distance of the vending machine 100 from the RF signal received from the RFID tag 185 of the user, and transfers the read information to the control unit 130.

The control unit 130 controls an image corresponding to the information read by the RFID reader 180 to be displayed on the display unit 160.

A process of displaying the menu screen 200 using the read information on the user will be hereinafter described with reference to FIGS. 11 and 12.

Figure 11:
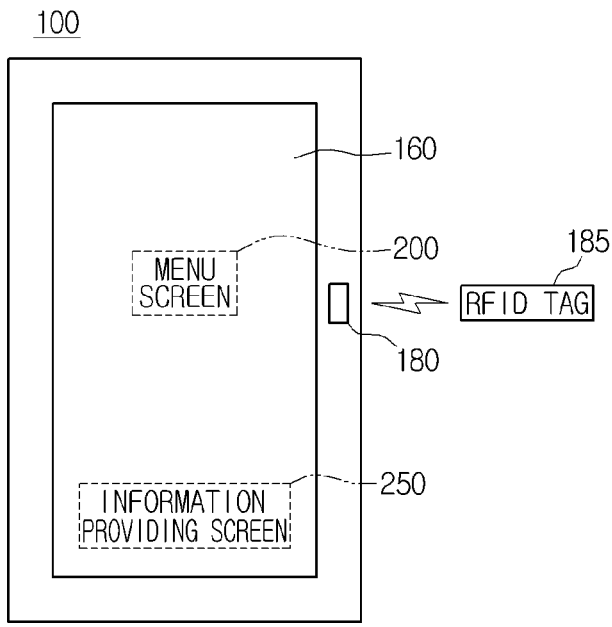
FIG. 11 illustrates a menu screen displayed on the vending machine according to the third exemplary embodiment of the present invention.
Figure 12:
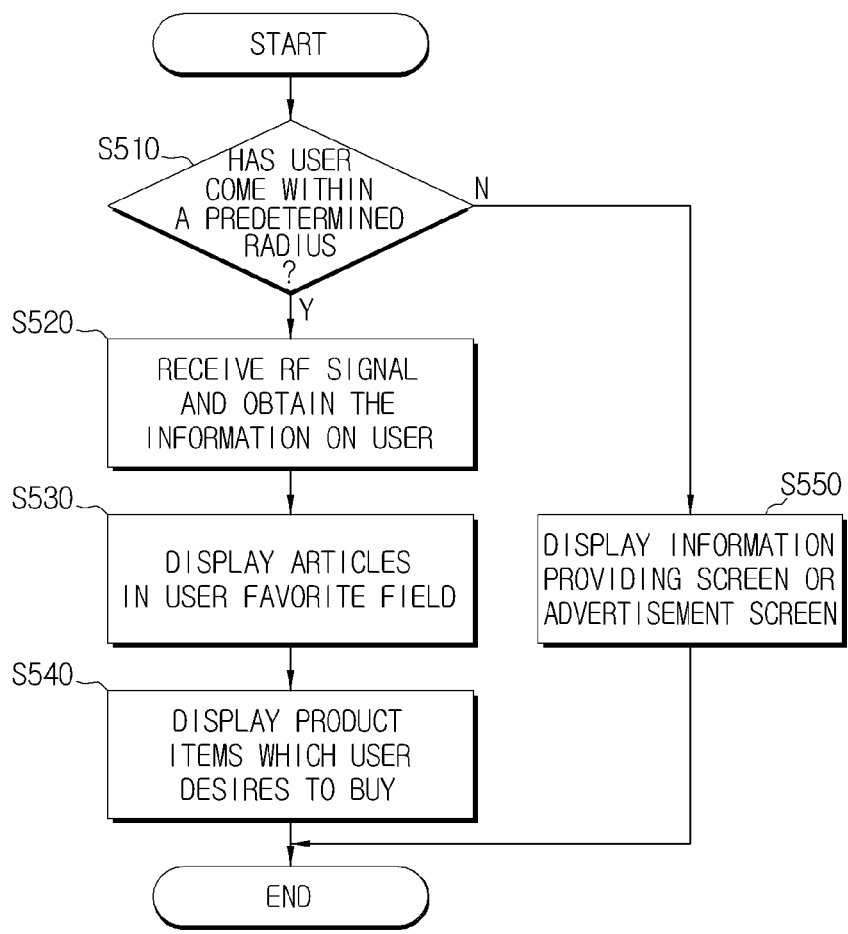
FIG. 12 is a flowchart illustrating a process of displaying the menu screen according to the third exemplary embodiment of the present invention.

FIG. 11 illustrates the vending machine 100 on which the menu screen 200 is displayed according to the third exemplary embodiment of the present invention, and FIG. 12 is a flowchart illustrating a process of displaying the menu screen 200 according to the third exemplary embodiment of the present invention.

In FIG. 11, the large-scale display unit 160 and the RFID reader 180, which receives an RF signal from the RFID tag 185 of the user, are disposed on the front of the vending machine 100. The RFID reader 180 extracts the RF signal containing the information on the user from the RFID tag 185. The control unit 130 causes the menu screen 200 and information providing screen 250 to be displayed based on the information contained in the RF signal.

The RFID reader 180 determines whether the user comes within a predetermined radius of the vending machine 100 (S510). If it is determined that the user is not located within the predetermined radius (S510-N), the control unit 130 causes the information providing screen or advertisement screen to be displayed on the display unit 160 (S550).

If it is determined that the user is located within the predetermined radius (S510-Y), the RFID reader 180 receives the RF signal from the RFID tag 185 of the user and obtains the information on the user (S520).

Subsequently, the control unit 130 causes articles in a user favorite field to be displayed on the information providing screen 250 based on the information on the user (S530), and controls a menu comprising product items which the user desires to buy to be displayed on the menu screen 200 (S540).

The user may set information on the user, such as articles in a user favorite field and product items which the user desires to buy, in advance, and may store the set information in the RFID tag 185. Alternatively, the RFID tag 185 may store only an identification (ID) of the user, and the user may set information on his or her favorite articles and products corresponding to his or her ID, and may store the set information in the vending machine 100.

Accordingly, the vending machine 100 may actively construct a menu according to the information on the user and may provide the information on the user, which enables the user to more easily and simply buy desired products, and a product provider to induce the user to buy products, thereby increasing sales.

Figure 13:
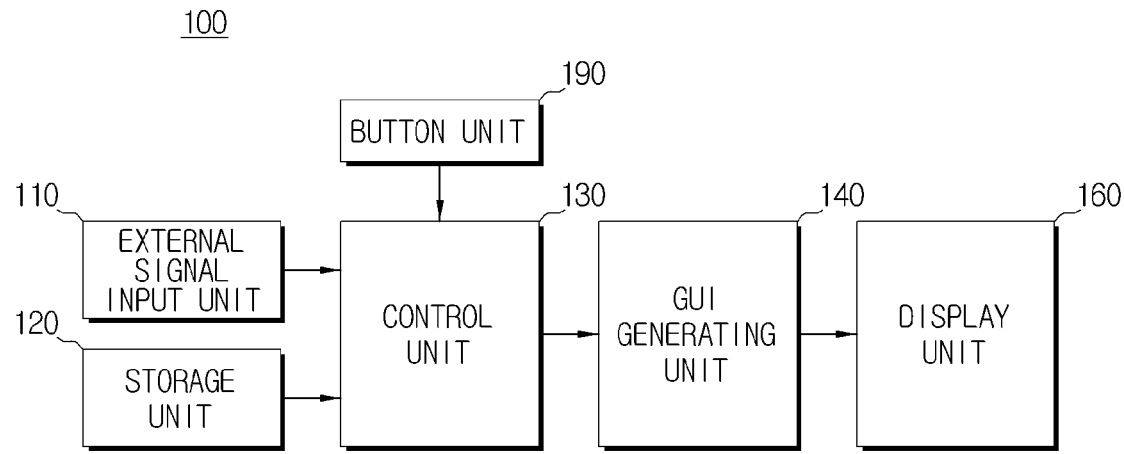
FIG. 13 is a block diagram of a vending machine according to a fourth exemplary embodiment of the present invention.

Hereinafter, a fourth exemplary embodiment of the present invention will be described in detail with reference to FIG. 13. FIG. 13 is a block diagram of a vending machine 100 according to the fourth exemplary embodiment of the present invention.

The vending machine 100 of FIG. 13 includes an external signal input unit 110, a storage unit 120, a control unit 130, a GUI generating unit 140, a display unit 160 and a button unit 190. Here, the external signal input unit 10, storage unit 120, GUI generating unit 140 and display unit 160 shown in FIG. 13 are similar to or the same as the external signal input unit 110, storage unit 120, GUI generating unit 140 and touch screen 150 shown in FIG. 1, so no further description thereof is required. Only the button unit 190 and control unit 130 shown in FIG. 13 are described below.

The button unit 190 includes a plurality of buttons and receives selection commands input by a user. The button unit 190 determines which button is selected from among the plurality of buttons, as user characteristic information, and transfers information on the selected button to the control unit 130.

The control unit 130 receives the information on the selected button from the button unit 190, and causes an image corresponding to the information on the selected button to be displayed on the display unit 160.

Specifically, the control unit 130 collects information on the button selected from among the plurality of buttons which are vertically arranged, in response to the selection command, and then determines the user's height based on the information on the selected button. The control unit 130 thus controls the GUI generating unit 140 to display the menu screen 200 based on the user's height. However, one of skill in the art would recognize that the plurality of buttons do not necessarily have to be arranged vertically, and instead may be arranged in other ways.

Hereinafter, a process of collecting information on the button selected by the user and displaying the menu screen 200 will be described in detail with reference to FIGS. 14 and 15.

Figure 14:
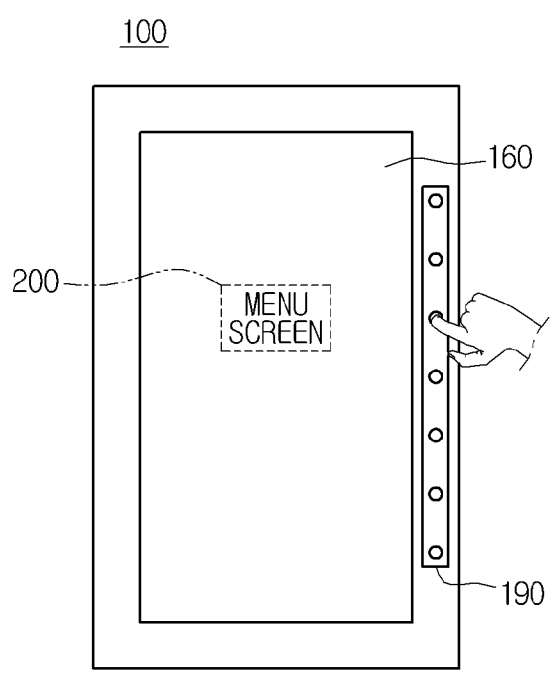
FIG. 14 illustrates a menu screen displayed on the vending machine according to the fourth exemplary embodiment of the present invention.
Figure 15:
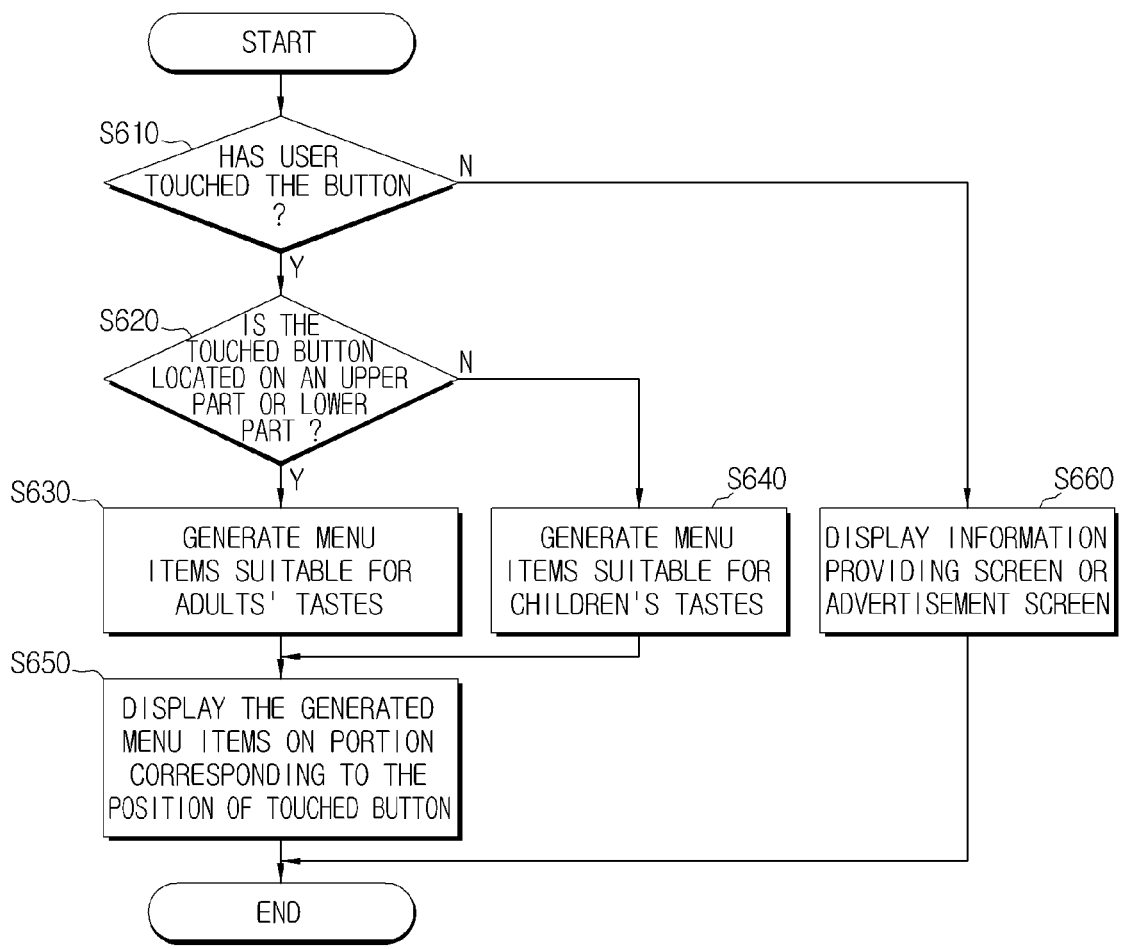
FIG. 15 is a flowchart illustrating a process of displaying the menu screen according to the fourth exemplary embodiment of the present invention.

FIG. 14 illustrates the vending machine 100 on which the menu screen 200 is displayed according to the fourth exemplary embodiment of the present invention, and FIG. 15 is a flowchart illustrating a process of displaying the menu screen 200 according to the fourth exemplary embodiment of the present invention.

In FIG. 14, the large-scale display unit 160 is disposed on the front of the vending machine 100, and the button unit 190 is disposed on one side of the vending machine 100 to receive user selection commands. The button unit 190 includes a plurality of buttons which are arranged vertically. As noted above, one of skill in the art would recognize that the plurality of buttons do not necessarily have to be arranged vertically, and instead may be arranged in other ways.

If the user selects one from among the plurality of buttons, the button unit 190 collects information on the user's height based on information on the selected button. Additionally, the control unit 130 causes the menu screen 200 to be displayed based on the information collected by the button unit 190.

The button unit 190 determines whether the user touches one of the plurality of buttons on the button unit 190 (S610). If it is determined that the user does not touch the button unit 190 (S610-N), the control unit 130 controls the information providing screen or advertisement screen to be displayed on the display unit 160 (S660).

If it is determined that the user has touched a button (S610-Y), the control unit 130 determines whether the touched button is located on an upper part or lower part of the button unit 190 (S620).

If it is determined that the touched button is located on the upper part of the button unit 190 (S620-Y), the control unit 130 controls the GUI generating unit 140 to generate menu items suitable for adults' tastes (S630). Alternatively, if it is determined that the touched button is located on the lower part of the button unit 190 (S620-N), the control unit 130 controls the GUI generating unit 140 to generate menu items suitable for children's tastes (S640).

For example, if the touched button is located on a part of the button unit 190 higher than 150 cm, the control unit 130 controls the GUI generating unit 140 to generate menu items suitable for adults' tastes, such as coffee, green tea or cigarettes; and alternatively, if the touched button is placed on a part of the button unit 190 lower than 150 cm, the control unit 130 controls the GUI generating unit 140 to generate menu items suitable for children's tastes, such as juice or cola drinks. Accordingly, the control unit 130 estimates the user's age according to the user's height based on the position of the touched button on the button unit 190, and then controls the GUI generating unit 140 to generate menu items suitable for the user's estimated age.

Subsequently, the control unit 130 causes the menu screen 200 comprising the generated menu items to be displayed on a part of the display unit 160 corresponding to the position of the touched button (S650). Thus, according to the control of the control unit 130, the menu screen 200 is caused to be displayed on a part of the display unit 160 corresponding to the user's height, so the user can select a desired menu item from the menu screen 200 more conveniently.

Therefore, the vending machine 100 estimates the user's age and constructs a menu according to whether the touched button is located on the upper part or lower part of the button unit 190, so it is possible for the user to buy desired products more easily and simply and it is also possible for a product provider to induce the user to buy products, thereby increasing sales.

Figure 16:
FIG. 16 is a block diagram of a product providing apparatus according to a fifth exemplary embodiment of the present invention.

FIG. 16 a block diagram of a product providing apparatus 700 according to a fifth exemplary embodiment of the present invention. The product providing apparatus 700 of FIG. 16 includes a collecting unit 710, a control unit 730 and a display unit 750.

The collecting unit 710 collects information regarding characteristics of a user located within a predetermined distance thereof.

The control unit 730 controls an image corresponding to the collected information to be displayed.

The display unit 750 displays video signals input from internal or external sources.

Figure 17:
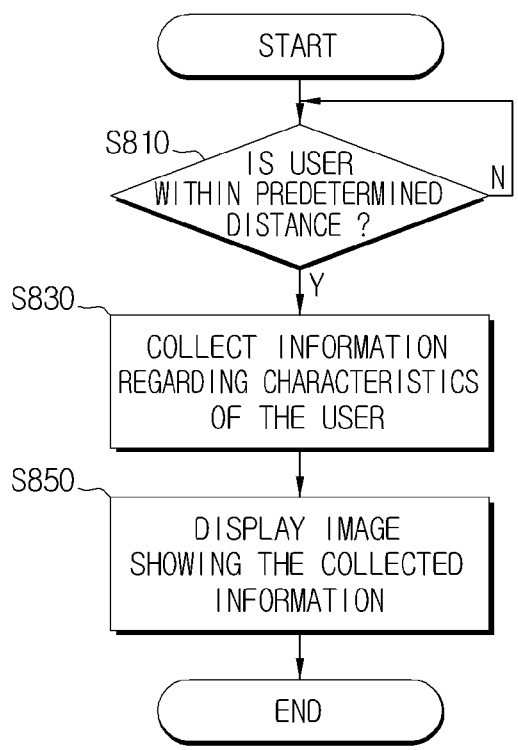
FIG. 17 is a flowchart illustrating a method for providing a graphical user interface (GUI) according to the fifth exemplary embodiment of the present invention.

FIG. 17 is a flowchart illustrating a method for providing a GUI according to the fifth exemplary embodiment of the present invention. In FIG. 17, the collecting unit 710 determines whether the user exists within the predetermined distance (S810).

If it is determined that the user exists within the predetermined distance (S810-Y), the collecting unit 710 collects information regarding characteristics of the user (S830).

The control unit 730 then controls an image showing the information collected by the collecting unit 710 to be displayed (S850).

Therefore, the user can buy desired products more easily and simply, and a product provider can induce the user to buy products to increase the sales.

While the vending machine is used as a product providing apparatus in the exemplary embodiments of the present invention, there is no limitation thereto. Accordingly, the present invention is also applicable to apparatuses which only provide products instead of selling products.

Figure 18:
FIG. 18 is a block diagram of a display apparatus according to a sixth exemplary embodiment of the present invention.

FIG. 18 is a block diagram of a display apparatus 800 according to a sixth exemplary embodiment of the present invention. The display apparatus 800 of FIG. 18 includes a control unit 810, a GUI generating unit 830 and a display unit 850.

The display unit 850 displays an image received from an external source.

The GUI generating unit 830 generates a GUI image to be displayed on the display unit 850.

The control unit 810 controls the GUI generating unit 830 to generate an image based on user characteristic information, and causes the generated image to be displayed on the display unit 850.

As described above, according to various exemplary embodiments of the present invention, a user may be provided with different screens according to user characteristic information, so it is possible for the user to buy desired products more easily and simply, and for a product provider to induce the user to buy products to increase the sales.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A product providing apparatus detecting a user located within a predetermined distance of the product providing apparatus, the apparatus comprising:
   a display unit;
   a sensing unit configured to generate user characteristic information; and
   a control unit, which generates user characteristic information by sensing a user characteristic regarding a user located within a predetermined distance of the product providing apparatus and controls the display unit to display a menu screen for at least one of products selected among a plurality of products based on the generated user characteristic information, configured to sense a distance between the product providing apparatus and a detected user, control the display unit to display an advertisement screen or an information providing screen regarding products which are provided by the product providing apparatus when any user is not detected or the detected user is not located within a predetermined distance, and control the display unit to display a menu screen selected from among a plurality of menu screens based on a user characteristic information on the detected user when the detected user is located within the predetermined distance,
   wherein the user characteristic information included in a radio frequency (RF) signal includes at least one of information on a preference of the user, a gender of the user and an age of the user, and
   wherein a first menu screen is selected and displayed when the user characteristic information is a first characteristic information, a second menu screen is selected and displayed when the user characteristic information is a second characteristic information, and at least one of menu items of the first menu screen is not included in the second menu screen.

2. The product providing apparatus as claimed in claim 1, wherein the display unit displays at least one of a menu screen showing products which the user is able to select, and an advertisement screen.

3. The product providing apparatus as claimed in claim 1, further comprising a collecting unit which includes a touch screen to collect location information on a part of the touch screen touched by the user, wherein the user characteristic information includes the location information.

4. The product providing apparatus as claimed in claim 3, wherein the display unit displays an advertisement screen to be displayed based on an age of the user, which is estimated based on a height of the part of the touch screen touched by the user.

5. The product providing apparatus as claimed in claim 3, wherein the collecting unit includes a position sensor to determine a body size of the user, wherein the user characteristic information includes the body size of the user.

6. The product providing apparatus as claimed in claim 5, wherein the user characteristic information includes a height of the user.

7. The product providing apparatus as claimed in claim 5, wherein the user characteristic information includes a field of vision of the user.

8. The product providing apparatus as claimed in claim 5, wherein the display unit displays an advertisement screen based on an age of the user, which is estimated based on the user characteristic information.

9. The product providing apparatus as claimed in claim 3, wherein the collecting unit includes a radio frequency identification (RFID) reader to read a radio frequency (RF) signal received from an RFID tag, wherein the RF signal includes the user characteristic information.

10. The product providing apparatus as claimed in claim 3, wherein the collecting unit includes a plurality of input buttons, and
   wherein the control unit controls the display unit to display the menu screen based on at least one input button selected by the user from among the plurality of input buttons.

11. The product providing apparatus as claimed in claim 3, wherein the collecting unit includes a position sensor to detect horizontal movement of the user with respect to the product providing apparatus, and
   wherein the user characteristic information includes the horizontal movement of the user.

12. The product providing apparatus as claimed in claim 11, wherein the image moves left or right based on the horizontal movement of the user.

13. The product providing apparatus as claimed in claim 11, wherein the menu screen moves left or right based on the horizontal movement of the user.

14. The product providing apparatus as claimed in claim 11, wherein a form of the menu screen changes based on the horizontal movement of the user.

15. A method for providing a graphical user interface (GUI) including an image, the method comprising:
   sensing a distance between the product providing apparatus and a detected user and determining whether the user is within a predetermined distance from a product providing apparatus;
   generating user characteristic information by sensing characteristics of the user, if it is determined that the user is within the predetermined distance of the product providing apparatus; and
   displaying an advertisement screen or an information providing screen regarding products which are provided by the product providing apparatus when any user is not detected or the detected user is not located within a predetermined distance, and displaying a menu screen selected from among a plurality of menu screens based on a user characteristic information on the detected user when the detected user is located within the predetermined distance,
   wherein the user characteristic information included in a radio frequency (RF) signal includes at least one of information on a preference of the user, a gender of the user and an age of the user, and
   wherein a first menu screen is selected and displayed when the user characteristic information is a first characteristic information, a second menu screen is selected and displayed when the user characteristic information is a second characteristic information, and at least one of menu items of the first menu screen is not included in the second menu screen.

16. The method as claimed in claim 15, wherein the displaying includes displaying at least one of a menu screen showing products which the user is able to select, and an advertisement screen.

17. The method as claimed in claim 15, further comprising collecting location information on a part of a touch screen touched by the user, wherein the user characteristic information includes the location information.

18. The method as claimed in claim 17, wherein the menu screen is an advertisement screen to be displayed based on an age of the user, which is estimated according to a height of the part of the touch screen touched by the user.

19. The method as claimed in claim 15, wherein the user characteristic information includes a body size of the user.

20. The method as claimed in claim 19, wherein the user characteristic information includes a height of the user.

21. The method as claimed in claim 19, wherein the user characteristic information includes a field of vision of the user.

22. The method as claimed in claim 19, wherein the menu screen includes an advertisement screen to be displayed based on an age of the user, which is estimated based on the user characteristic information.

23. The method as claimed in claim 17, wherein the collecting includes collecting the user characteristic information from a radio frequency (RF) signal received from a radio frequency identification (RFID) tag, wherein the user characteristic information is included in the RF signal.

24. The method as claimed in claim 17, wherein the collecting includes receiving a selection of at least one input button selected from among a plurality of input buttons, and
   wherein the generating is performed based on the input button selected from among the plurality of input buttons.

25. The method as claimed in claim 17, wherein the collecting includes detecting horizontal movement of the user, and
   wherein the generating the image is performed based on the horizontal movement of the user.

26. The method as claimed in claim 25, wherein the image moves left or right based on the horizontal movement of the user.

27. The method as claimed in claim 5, wherein the menu screen moves left or right based on the horizontal movement of the user.

28. The method as claimed in claim 25, wherein a form of the menu screen changes based on the horizontal movement of the user.

29. A display apparatus comprising:
   a display unit;
   a sensing unit configured to generate user characteristic information;
   a graphical user interface (GUI) generating unit which generates a GUI including at least one of images having different characteristics regarding purchase of products; and
   a control unit, which generates user characteristic information by sensing a user characteristic regarding a user located within a predetermined distance of a product providing apparatus, controls the GUI generating unit to generate a menu screen for at least one of products selected among a plurality of products based on the user characteristic information, and controls the display unit to display the menu screen, configured to sense a distance between the product providing apparatus and a detected user, control the display unit to display an advertisement screen or an information providing screen regarding products which are provided by the product providing apparatus when any user is not detected or the detected user is not located within a predetermined distance, and control the GUI generating unit to generate a menu screen selected among a plurality of menu screens based on a user characteristic information on the detected user when the detected user is located within the predetermined distance, wherein the user characteristic information included in a radio frequency (RF) signal includes at least one of information on a preference of the user, a gender of the user and an age of the user, and wherein a first menu screen is selected and displayed when the user characteristic information is a first characteristic information, a second menu screen is selected and displayed when the user characteristic information is a second characteristic information, and at least one of menu items of the first menu screen is not included in the second menu screen.

30. The display apparatus as claimed in claim 29, wherein the user characteristic information includes at least one of information on a part of the display unit touched by a user, information on a height of the user, information on horizontal movement of the user, information on a button selected by the user, and information on the user contained in a radio frequency identification (RFID) signal received from a radio frequency (RF) tag of the user.

31. The display apparatus as claimed in claim 29, wherein the image corresponds to at least one of information on a preference of the user, a gender of the user, and an age of the user which are obtained based on the user characteristic information.

32. The product providing apparatus as claimed in claim 1, wherein the different characteristic comprises a difference of a constructing menu UI or advertisement contents.

33. The method as claimed in claim 15, wherein the different characteristic comprises a difference of a constructing menu UI or advertisement contents.

34. The display apparatus as claimed in claim 29, wherein the different characteristic comprises a difference of a constructing menu UI or advertisement contents.

35. The product providing apparatus as claimed in claim 1, wherein the control unit controls the display unit to display an image corresponding to the generated user characteristic information if the user is located within the predetermined distance, and controls the display unit to display an image providing an advertisement of products stored in the product providing apparatus if the user is not located within the predetermined distance.

36. The method as claimed in claim 15, wherein the displaying comprises displaying an image corresponding to the generated user characteristic information if it is determined that the user is located within the predetermined distance and displaying an image providing an advertisement of products stored in a product providing apparatus if it is determined that the user is not located within the predetermined distance.

37. The display apparatus as claimed in claim 29, wherein the control unit controls the display unit to display an image corresponding to the generated user characteristic information if the user is located within the predetermined distance, and controls the display unit to display an image providing an advertisement of products stored in the product providing apparatus if the user is not located within the predetermined distance.

* * * * *